Patented Nov. 9, 1948

2,453,150

UNITED STATES PATENT OFFICE 2,453,150

POLYESTERS OF DIMETHYLENE D-GLUCONIC ACID

Charles L. Mehltretter, Peoria, Ill., assignor to the United States of America as represented by the Secretary of Agriculture No Drawing. Application August 12, 1947, Serial No. 768,256

2 Claims. (Cl. 260—338)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to polyesters of dimethylene d-gluconic acid, which are of high molecular weight, and which are useful in the production of coating compositions, synthetic fibers, adhesives, and so forth.

Dimethylene d-gluconic acid is a substituted sugar acid having the structural formula

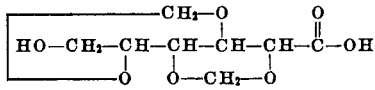

It is easily prepared by reacting formaldehyde with gluconic acid in the presence of a mineral acid (Henneberg and Tollens, Ann. 292, 34). These two raw materials are commercially available at low cost.

In general, according to the invention, the dimethylene d-gluconic acid, dissolved in an anhydrous solvent such as a tertiary amine, for example pyridine, is treated with an acid halide, preferably a benzyl halide such as benzoyl chloride, to form by condensation polymerization the polyester of the acid.

The temperature may be varied over wide limits. At room temperature, the polyester begins to precipitate almost immediately, and on standing a short time good yields are obtained. Temperatures as low as 15° C. may be employed, and as high as the boiling point of the solvent. The precipitate may be easily separated from the liquid phase, as by filtering, and be washed. From the mother liquors further polymers fractions of lower molecular weight may be obtained by concentrating the solutions.

The polyester formed is linear. The exact mechanism of the esterification reaction is not known but for illustrative purposes may be represented by the reaction of the carboxyl group of one molecule of dimethylene gluconic acid with a hydroxyl group of another molecule of dimethylene glyconic acid. In this manner many residue molecules of the acid are so joined (at least 5 to upward of 100). The polyester may, therefore, be represented by the formula

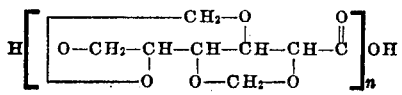

where $n$ is an integer of at least 5, the residue molecule structure within the bracket being hereinafter referred to as the "dimethylene gluconyl unit."

The following example exhibits the invention in greater detail:

Example I

A solution of dimethylene d-gluconic acid in dry pyridine is prepared by adding 5 to 7 grams of the acid to 100 cc. of dry pyridine, heating the mixture to effect solution and cooling. A molecular equivalent of benzoyl chloride is mixed with the solution. The polyester starts to precipitate almost immediately, and the reaction mixture is allowed to stand for several hours. The precipitate is separated from the liquid phase by filtration, washed with dry pyridine and washed again with ethyl acetate. It melts at approximately 270° C. It apparently is a polyester of the dimethylene d-gluconic acid having from about 20 to over 100 dimethylene gluconyl units. When moistened with pyridine and diluted with water the product forms a gel. It dissolves in foramide and formic acid to form a solution which gelatinizes on standing.

Analysis: found C, 47.4 to 47.5 percent; H, 4.95 percent; HCHO, 29.8 percent. Calculated for polyester of 20 units: C, 47.3 percent; H, 5.0 percent; HCHO, 29.6 percent. Calculated for polyester of 100 units: C, 47.5 percent; H, 5.0 percent; HCHO, 29.7 percent.

The pH of a suspension in water was 5.52 while the pH of the water used was 5.85.

Example II

One mole of dimethylene d-gluconic acid was polymerized with slightly more than one mole of benzoyl chloride in a manner corresponding to Example I. The polyester starts to precipitate almost immediately, and the reaction mixture is allowed to stand for several hours. The precipitate is separated from the liquid phase by filtration, washed with dry pyridine, and washed again with ethyl acetate. The percentage of carbon found was 47.9 to 47.8 and of hydrogen was 5.19 to 4.98 (dry basis).

Triturating in hot water, ethanol, and then acetone gave a product that analyzed for carbon 47.7 percent and for hydrogen 5.07 to 5.26 percent on a dry basis. The melting point was 265° to 268° C. (effervescent). The analysis indicated that some of the end hydroxyl groups are benzoylated and that at least 40 dimethylene gluconyl units are present in the polyester.

The pyridine filtrate of the first fraction 1 of polymer was concentrated in vacuo to one-fifth of its original volume and diluted with an equal volume of ethyl acetate. A second fraction of polymer of smaller chain length precipitated and was washed with hot water.

Analysis: C, 49.8 to 49.4 percent; H, 4.91 to 4.84 percent (dry basis); M. P. 235° to 240° C. (effervesces).

Upon cooling the hot water extract of fraction 2, a third fraction of polymer separated from solution.

Analysis: C, 49.8 to 50.2 percent; H, 4.93 to 5.00 percent; M. P. 186° to 198° C. (effervesces).

From the analyses of fractions 2 and 3 it appears that these products are benzoylated polymers of about 4 to 5 units.

Fractions 1, 2 and 3 when moistened with pyridine and diluted with water form gels. However, only fraction 1 gels in formic acid.

The relative viscosities of 0.5 percent solutions of these fractions in formamide were determined and their values tabulated below. Fraction 1 was readily dispersed in formamide and formed a viscous translucent solution similar in appearance to gelatinized starch dispersions in water. The other two fractions, however, formed clear thin solutions.

| Polymer fraction | Average, percent | | Units in polymer | Relative viscosity (0.5+ solution in formamide) |
|---|---|---|---|---|
| | C | H | | |
| 1 | 47.8 | 5.09 | 40–100 | 1.67 |
| 2 | 49.6 | 4.88 | 4–5 | 1.05 |
| 3 | 50.0 | 4.97 | 4–5 | 1.02 |

Fraction 1 polymer is practically insoluble in water, pyridine, ethanol, dioxane, ether, chloroform, ethyl acetate, and benzene.

The polyesters of this invention are relatively insoluble in the usual solvents, such as water, pyridine, ethanol, dioxane, benzene, chloroform, and the like. In aqueous solutions of pyridine, formamide, and ammonia, they form gelatinous suspensions which are usually transparent and quite viscous. They are white amorphous solids which melt at about 260° to 270° C.

Having thus described the invention, what is claimed is:

1. A polyester of dimethylene d-gluconic acid of the following structural formula:

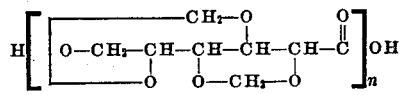

in which $n$ is an integer of at least 5.

2. The process of forming a polyester comprising effecting condensation polymerization of dimethylene d-gluconic acid in an anhydrous solvent in the presence of a benzoyl halide, and separating the precipitate of the polyester thus formed from the liquid phase.

CHARLES L. MEHLTRETTER.

REFERENCES CITED

The following references are of record in the file of this patent:

Haworth et al., Journal of the Chem. Soc. 1944, page 58–61. (Copy in Library.)